Patented Feb. 14, 1950

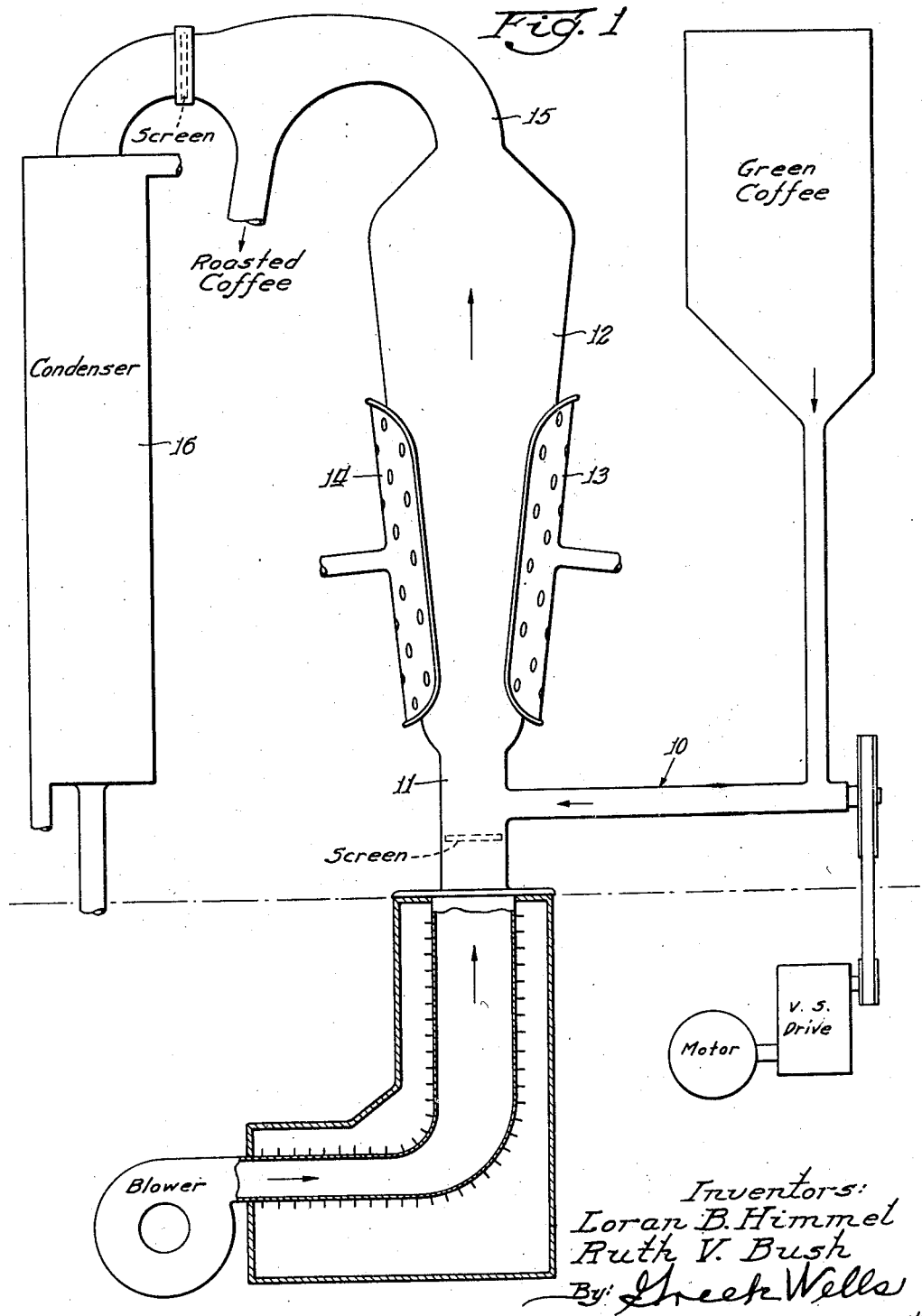

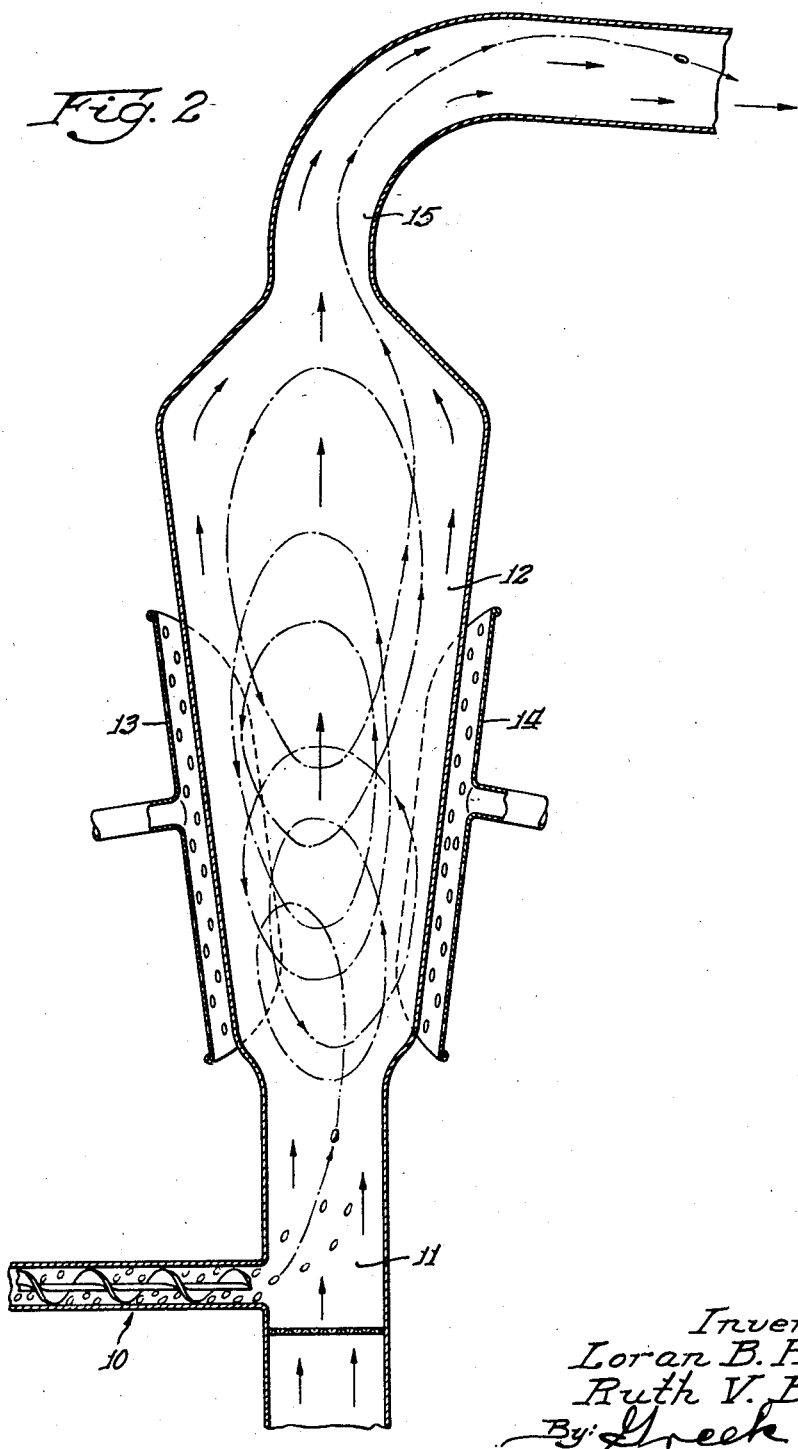

2,497,501

UNITED STATES PATENT OFFICE 2,497,501

TREATMENT OF COFFEE, ETC.

Loran B. Himmel and Ruth V. Bush, Des Moines, Iowa, assignors, by mesne assignments, to Ross M. Carrell Application April 27, 1946, Serial No. 665,521

3 Claims. (Cl. 99—68)

Our invention relates to the treatment of coffee and is particularly directed to a process of heating and roasting of the coffee bean whereby to improve the uniformity of roasting and to make available an increased amount of water soluble matter in the coffee. The invention is applicable alike to the whole bean and to cut beans.

Coffee beans in their green state vary greatly in their characteristics. The sizes may vary greatly in beans of the same kind and different varieties have different sizes. Density, hardness, and moisture content are other characteristics that are variable. In the roasting of coffee these variations make it very difficult to obtain any reasonable degree of uniformity. One purpose of our invention is to provide a method of treatment whereby the roasting is conducted in such fashion as to be responsive to the individual characteristics of the coffee particles, thus reducing the probabilities of over roasting or under roasting any of the particles. In other words the roasting process is such as to be selectively responsive to the degree of roasting of each bean.

It is also a purpose of our invention to apply the roasting heat necessary in a novel manner whereby to heat the hard outer shell of the bean in one way and the interior of the bean in another way so that over roasting of the shell is not necessary in order to obtain adequate roasting of the interior.

More specifically our invention contemplates the treatment of the coffee particles with external heat to roast the exterior shell and during at least a part of the external heating, to heat the interior of the particles by means of high frequency electrical forces effective to generate heat and pressure within that portion of the coffee bean that is covered by the hard shell and make available a larger amount of water soluble extract than has heretofore been possible. In accordance with our invention the coffee may be blended first by combining the desired varieties in their proper proportions and then roasting and finally extracting the soluble matter in water, or, alternatively first roasting then blending and then extracting, or roasting and extracting and then blending the extract. The treatment may be of the whole bean or the bean may be cut or ground before treatment. If cut or ground, however, the particles need to be sized roughly since the treatment is less accurate when extremely fine material and coarse particles are used together.

In the roasting process a substantial amount of aromatic volatile matter is driven out. This volatile matter is according to our invention, condensed and recovered for subsequent addition to the extract obtained from the roasted particles.

In order to obtain the maximum extraction of soluble matter our invention contemplates also in the extraction process, the additional step of applying ultra high frequency heating to the particles while wet, after initial extraction of the water soluble materials, or during the extraction process, so as to aid hydrolysis and further extraction of those parts of the bean that are not readily soluble in boiling water after roasting.

In carrying out the invention we utilize the apparatus shown in Figures 1 and 2 of the accompanying drawings wherein Figure 1 shows the entire system, and Figure 2 illustrates the movement of particles through the roasting chamber.

The showing is somewhat diagrammatic, but is believed to be sufficient to illustrate the invention and a practical mode of carrying out the roasting process. The means for applying ultra high frequency energy is shown only by the plates. We prefer to use the system shown in the patent application of Loran B. Himmel, Serial No. 605,394, as a source of high frequency energy.

In the treatment of the coffee in whole beans or cut, the particles of coffee are fed by a suitable feeding device 10 shown as a screw feeder, into the path of a rising stream of hot gas at 11. The stones etc. that are quite heavy may be separated from the coffee at this point. The hot gas may be air $CO_2$, nitrogen or any other suitable fluid. The temperature of the hot gas may vary over quite a wide range to be chosen by the operator. For example temperatures from 200° C. to 600° C. may be employed. The gas stream carries the coffee particles upwardly into an upwardly expanding chamber 12 where they are subjected to the radiations of high frequency electrical energy between plates 13 and 14.

The materials used for the chamber and associated inlets and outlets is preferably a pyrex glass. The frequency used is variable, but is usually not less than ten million cycles per second. It is a characteristic of the coffee particles that in this high frequency dielectric heating field the outer shell is least susceptible to heating by it so that the dielectric heating is greatest in the interior of a bean. Also the susceptibility of the interior increases with rise in temperature so that the interior heating starts slowly but rises at an increasing rate. The shell of the bean changes most in volume under heating. The beans lose as much as 12% to 18% of their weight in roasting. The gain in volume is substantial too. A gain of as much as 20% is often made during the roasting.

The chamber 12 being expanded upwardly provides lower velocity toward the top for the stream of hot gases, and, until there is a substantial loss of weight and increase in volume, the beans will remain in the chamber, and circulate up and down through the electric field moving upwardly more as they lose weight and gain volume as indicated in Figure 2. Then when the interior heating begins to rise rapidly, loss of weight and gain in volume immediately cause the bean to be elevated quickly by the rising gas stream and thrown out of the range of the high frequency energy. Continued effect of the exterior heating by the gases causes further reduction in specific gravity and movement of the roasted bean to the top of the chamber 12, and to the restricted outlet 15 where the velocity of the stream of gas is enough to whisk the beans over into a discharge passage from which they are conveyed to an extraction unit, a grinder, or to a storage place. The volatile materials that are initially driven out of the particles are collected by a condenser 16, and this highly aromatic condensate is saved for adding to the extract obtained from the roasted particles.

This method of treating the coffee particles by internal heat has been found to increase the yield of water soluble materials. The action of the high frequency energy appears to effect a greater break down of the structure within the bean than is possible with exterior heat to thus make water solubles more readily available. Also it avoids destruction of water soluble components since it avoids over roasting at excessive temperatures or for excessive time. The combination of internal and external heating gives uniformity of roasting to a greater degree than we have been able to attain by either way of heating alone. It is characteristic of coffee that lighter or smaller beans roast more quickly than heavier beans. The selective action of the gas stream lifts the lighter particles through the dielectric zone more quickly to avoid burning. The entire cycle of a bean in the roasting zone by our process is a matter of seconds of time. The process is continuous since new particles or beans fed into the gas stream remain only so long as is necessary to complete the roasting.

The coffee after grinding and during or after initial extraction of the solubles is again subjected to the action of the high frequency energy of essentially the frequencies described above. While normally the water would tend to selectively absorb the energy there appears to be a tendency of any parts of the bean not previously completely broken down in heating to act as a node or point where high potentials develop and spot heating occurs in the particle to free more soluble matter. The energy source for the high frequency may be the same as for the roasting.

Our invention is characterized broadly by the selective roasting of coffee particles while floating them on a fluid medium. Also by combining external heat and internal heat to effect quick selective roasting.

Internal dielectric heating is aided by tumbling the particles in the fluid medium which results naturally from the currents of gas. Mechanical vibration may be used to further the tumbling. It is helpful since the field of energy is polarized, to effect turning of the particles to present the electrical forces from all angles upon the particle structure.

Having thus described our invention, we claim:

1. A method of roasting coffee particles which comprises suspending the particles in an upwardly moving gaseous stream having a density below that of the particles, maintaining the temperature of the gaseous stream sufficiently high to permit roasting of the particle, subjecting the suspended particle to an high frequency electrical field to roast internally and controlling the rate of upward flow of the gaseous stream so that the particles remain suspended in the field until a substantial reduction of the density of the particle has occurred and thereafter are swept from the field by the gaseous stream.

2. A method of roasting coffee beans which comprises forming a fluidized suspension of coffee beans in a gas, maintaining the temperature of the gas at coffee roasting temperature, simultaneously subjecting the fluidized suspension to the roasting action of an high frequency electric field, and maintaining the upward flow of gas sufficiently high to hold the suspension in fluidized state until a substantial reduction in density of the bean has occurred during roasting and causing the roasted beans of substantially decreased density to be swept out of the electric field.

3. A method of roasting coffee beans which comprises forming a fluidized suspension of coffee beans in a gas, maintaining the temperature of the gas at coffee roasting temperature, simultaneously subjecting the fluidized suspension to the roasting action of an high frequency electric field, and maintaining the upward flow of gas sufficiently high to hold the beans suspended during roasting, decreasing the upward rate of gas flow as roasting proceeds and until roasting has proceeded to the desired degree in order to compensate for loss in density of the bean and thereby to retain the bean in the field and maintaining the upward gas flow sufficiently high to cause beans to escape from the field when they achieve a desired minimum density.

LORAN B. HIMMEL.
RUTH V. BUSH.

REFERENCES CITED

The following references are of record in the file of this patent:

UNITED STATES PATENTS

| Number | Name | Date |
|---|---|---|
| 1,900,072 | Quinn | May 7, 1933 |
| 1,900,573 | McArthur | Mar. 7, 1933 |
| 2,212,120 | Kneale et al. | Aug. 20, 1940 |
| 2,292,255 | Weisberg | Aug. 4, 1942 |
| 2,348,066 | Goldfine | May 2, 1944 |